May 26, 1931. J. KUHAJDA 1,807,414
ROTARY ENGINE
Filed Nov. 20, 1929
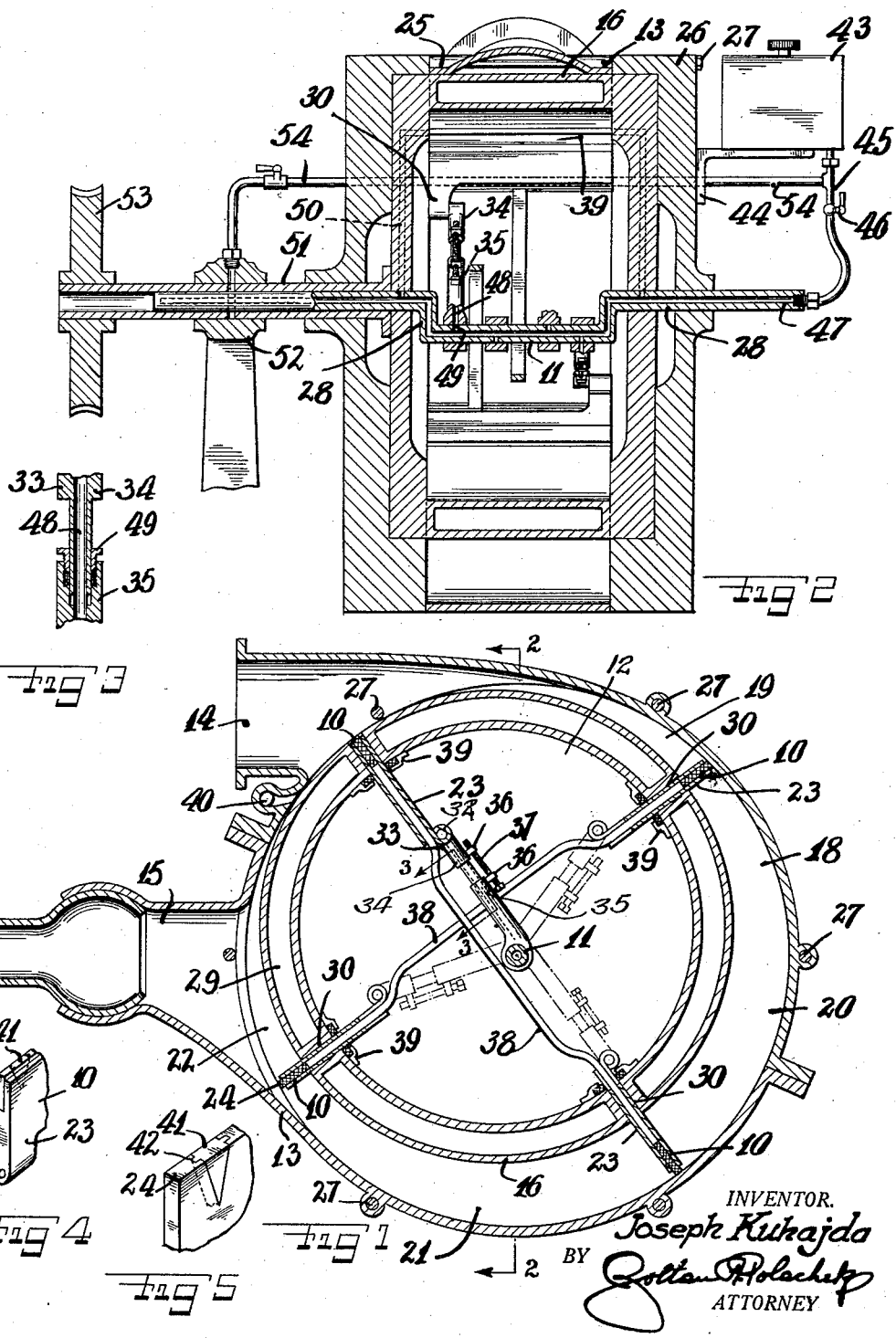

Patented May 26, 1931

1,807,414

UNITED STATES PATENT OFFICE

JOSEPH KUHAJDA, OF MASPETH, NEW YORK

ROTARY ENGINE

Application filed November 20, 1929. Serial No. 408,474.

This invention relates to new and useful improvements in a rotary engine.

The invention has for an object the provision of a device of the class mentioned which is of simple, durable construction, dependable in use and efficient in action, and which can be manufactured and sold at a reasonable cost.

The invention proposes radial piston blades rotatively supported on an axle coaxial with the axis of a circular hollow in a stationary casing having an inlet and an exhaust connected with the hollow and a cylindrical rotor eccentrically mounted within and tangential with the hollow at a point intermediate said inlet and exhaust so as to form a crescent shaped space between the casing and rotor, and dividing said crescent shaped space into several separate chambers, and each comprising a flat hollow socket slidably extending thru said rotor and adjustably distant from the casing, and a sealing plate within the hollow socket and urged into engagement with the casing For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a vertical sectional view of a device constructed according to this invention.

Fig. 2 is a transverse vertical sectional view taken on the line 2—2 of Fig. 1.

Fig. 3 is an enlarged fragmentary sectional view taken on the line 3—3 of Fig. 1.

Fig. 4 is a fragmentary perspective detailed view of one of the piston blades per se.

Fig. 5 is a fragmentary detailed perspective view of the sealing plate per se used in the piston blade.

The rotary engine includes radial piston blades 10 rotatively supported on an axle 11 concentric with a circular hollow 12 in a stationary casing 13 having an inlet 14 and an exhaust 15 connected with the said hollow 12. A cylindrical rotor 16 is eccentrically mounted within and tangential at 17 with the hollow 12, said tangential point being intermediate said inlet 14 and exhaust 15 so as to form a crescent shaped space 18 between the casing 13 and the rotor 16. The piston blades divide the said crescent shaped space into several separate members 19, 20, 21 and 22. Each piston blade comprising a flat hollow socket 23 slidably extending thru said rotor 16 and adjustably distant from the casing 13, and a sealing plate 24 within the hollow socket 23 and urged into engagement with the casing by means of springs 38.

The said stationary casing 13 is composed of three parts namely a central part 25 and end caps 26. Long bolts 27 hold these three parts together. The hollow 12 of the casing 13 is formed within the central part 25. The inlet 14 is substantially tangential at the top of the hollow 12 and the exhaust 15 is on the same side as the inlet but below, preferably slightly beneath the horizontal center line. The axle 11 constitutes a stationary rod with its central portion coinciding with the axis of the hollow 12 and its end portion 28 offset and coinciding with the axis of the rotor 16.

The said cylindrical rotor 16 is formed with a very thick periphery preferably cored as indicated by numeral 29 and formed with a plurality of passages 30 for the extension of the socket members 23. The inner end of each of the socket members 23 is formed with a boss 31 supporting a pintle pin 32 connected with a radial arm 33 pivotally mounted at its inner end upon the axle 11. Each of these radial arms are formed of two sections namely an outer section 34 and an inner section 35. These sections telescopically engage each other as clearly shown in Fig. 3.

Lugs 36 project from each of the sections and are threadedly engaged by a screw 37 having right and left hand threads and so arranged that upon rotation the sections of the radial arm are drawn together or moved apart. Expansion springs 38 extend between diametrically opposite sockets 23 and engage within these sockets and are arched so as to provide expanding and normally urging the sealing plates 24 firmly against the casing 13. Packing members 39 are mounted upon the rotor 16 and surround each of the socket members 23 for receiving oil as hereinafter fully described for providing proper lubrication.

A second outlet 40 is arranged upon the casing 13 between the exhaust 15 and the tangential point 17 so as to communicate with one of the ends of the crescent shaped space 18 and so as to receive gases entrapped in this end and compressed by the piston blades. This compressed gas may be stored, exactly how not shown on the drawings and used for priming the engine or for other desirable purposes. Near the ends of each of the sealing plates 24, wedges 41 are inserted. The sealing plates are formed with V shaped notches to receive these wedges. The wedges act against the casing 13 and normally serve to slightly spread the sealing plate so as to urge the sides of the sealing plate against the end caps 26 of the casing and provide a gas tight joint. Each of these wedge shaped members 41 are provided with lateral tongues 42 engaging in grooves in the plate.

An oil storage tank 43 is shown supported upon the casing 13 by a bracket 44 and is provided with an outlet pipe 45 having a control valve 46 and connected with a passage 47 thru the axle rod 11. Each of the radial arms 33 are provided with passages 48 alignable with slots 49 communicating with the passage 47. The passages 48 in the radial arms serve to direct oil to the pintle pins 32. A packing gland 49 is arranged upon one of the sections of the arms for insuring an oil tight joint and at the same time permitting expansion or contraction of the arms.

The sides of the rotor 16 are formed with oil passages 50 connected for discharging oil into the packings 39 so as to provide proper lubrication for the slidable socket members 23. A driven spindle 51 is attached upon one side of the rotor 16 coaxial with its center and is rotatively supported by a bearing 52 and carries a gear wheel 53 for connection to machinery or other sources adapted for the receiving of power. An oil pipe 54 is shown connected with the oil tank 43 and with the bearing 52.

In operation of the rotary engine, gases at high velocity, preferably from the exhaust of a gas engine are passed into the inlet 14. Of course the driving fluid need not be the exhaust gases from an engine but may be compressed air or other desirable fluid. The velocity of the driving fluid impinges against one of the radial piston blades 10 and causes rotation about the axis 11. Obviously, as the piston blades moves, this rotation is communicated to the cylindrical rotor 16.

As the rotation continues, the crescent shaped space in which the gas is housed permits slight expansion of the gas which aids to the rotation of the engine in that unbalanced forces are provided. After the gases perform their rotating work they exhaust from the exhaust connection 15. Some of the gas is entrapped in the end of the crescent shaped space 22 and is compressed and discharged from the outlet 40. The sealing plates 24 are slightly flexible and soft so as to firmly act against the casing 13 for excessive wear. To prohibit bending to an undesirable amount, the sockets 23 are provided which serve to encase the greater part of the plates 24 and normally hold them from bending.

The screws 37 may be adjusted for adjusting the positions of the socket members from the casing 13 so that the most efficient gas seal may be obtained between the sealing plates and the casing. If the distance between the socket member and the casing is too large, too much bending of the sealing plates occur which is undesirable and in such a case adjustment must be made to extend the socket so as to reduce the distance to the casing. The springs 38 act at all times to urge the sealing plates against the casing and provide a gas tight joint.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, radial piston blades supported on an axle coinciding with the axis of a circular hollow in a stationary casing, radial arms consisting of telescopic sections mounted on said axle and pivotally connected with said piston blades and constituting the supporting means of the piston blades and means for holding the telescopic sections in various longitudinal positions for constituting an adjustment of the piston blade.

2. In a device of the class described, a casing formed with a circular hollow, an axle coinciding with the axis of the circular hollow and rotatively mounted within said casing, radial arms consisting of telescopic sections mounted on said axle, piston blades pivotally connected to the radial arms and engaging against said casing, and means for holding the telescopic sections of the said radial arms in various longitudinal positions for constituting an adjustment of the piston blades comprising lugs projecting from each of the sections of the radial arms, and a screw having right and left hand threads threadedly engaged through the said lugs so that upon rotation of the sections of the radial arms move together or apart.

In testimony whereof I have affixed my signature.

JOSEPH KUHAJDA.